US011911894B2

United States Patent
Simons et al.

(10) Patent No.: US 11,911,894 B2
(45) Date of Patent: Feb. 27, 2024

(54) METHOD AND SYSTEM FOR MANIPULATING ARTICLES

(71) Applicant: INTELLIGRATED HEADQUARTERS, LLC, Mason, OH (US)

(72) Inventors: John Simons, St. Louis, MO (US); Matthew R. Wicks, St. Charles, MO (US); Grant R. Jeremiah, Steeleville, IL (US); Benjamin Baer, Kirkwood, MO (US)

(73) Assignee: INTELLIGRATED HEADQUARTERS, LLC, Mason, OH (US)

(*) Notice: Subject to any disclaimer, the term of this patent is extended or adjusted under 35 U.S.C. 154(b) by 564 days.

(21) Appl. No.: 16/868,695

(22) Filed: May 7, 2020

(65) Prior Publication Data

US 2020/0353629 A1 Nov. 12, 2020

Related U.S. Application Data

(60) Provisional application No. 62/845,495, filed on May 9, 2019.

(51) Int. Cl.
*B25J 15/06* (2006.01)
*B25J 9/14* (2006.01)
(Continued)

(52) U.S. Cl.
CPC .......... *B25J 15/0658* (2013.01); *B25J 9/144* (2013.01); *B25J 9/1653* (2013.01); *B25J 9/1664* (2013.01);
(Continued)

(58) Field of Classification Search
CPC .... B25J 15/0616; B25J 15/0658; B25J 9/144; B25J 9/1653; B25J 9/1664; B25J 9/1679;
(Continued)

(56) References Cited

U.S. PATENT DOCUMENTS 3,973,682 A * 8/1976 Neff .................... H01L 21/6838
294/186
4,557,514 A 12/1985 Cushman et al.
(Continued)

FOREIGN PATENT DOCUMENTS

| EP | 2463065 A1 | 6/2012 | |
|----|------------|--------|----|
| KR | 101710325 B1 * | 2/2017 | |
| WO | WO-2018168030 A1 * | 9/2018 | .............. B23P 19/04 |

OTHER PUBLICATIONS

Piab, Perfect Suction Cups For Bagging, Boxing and Palletizing, (2017) [retrieved on Jul. 20, 2020] retrieved from the Internet URL: https://www.piab.com/news/press-releases/perfect-suction-cups-for-bagging-boxing-and-palletizing/, 2 pages.
(Continued)

*Primary Examiner* — Dean J Kramer
(74) *Attorney, Agent, or Firm* — Alston & Bird LLP

(57) ABSTRACT

Various example embodiments described herein relates, to an item manipulation system that can include a control system and an end effector. The end effector can include a tube defining a channel between a first end and a second end. The tube can include, a flexible suction cup that can be disposed within the channel of the tube. In some examples, the flexible suction cup can engage a surface of the item based on suction force generated through the flexible suction cup. The end effector also includes a linear actuator that can be mechanically coupled to the flexible suction cup. The end effector can be configured to: extend, the flexible suction cup towards the second end of the channel to position at least a portion of the flexible suction cup outside the tube and
(Continued)

retract, the flexible suction cup within the channel to position the flexible suction cup within the tube.

15 Claims, 9 Drawing Sheets

(51) Int. Cl.
  *B25J 19/04* (2006.01)
  *B25J 9/16* (2006.01)
  *B25J 13/08* (2006.01)
(52) U.S. Cl.
  CPC .......... *B25J 9/1679* (2013.01); *B25J 9/1697* (2013.01); *B25J 13/08* (2013.01); *B25J 15/0616* (2013.01); *B25J 15/0675* (2013.01); *B25J 19/04* (2013.01)
(58) Field of Classification Search
  CPC .......... B25J 9/1697; B25J 13/08; B25J 19/04; B66C 1/0206; B66C 1/0243; B65G 47/912; B65G 47/917; B65G 47/918
  See application file for complete search history.

(56) References Cited

U.S. PATENT DOCUMENTS

| | | | | |
|---|---|---|---|---|
| 4,852,247 | A * | 8/1989 | Hawkswell | B65G 47/91 294/2 |
| 5,110,239 | A * | 5/1992 | Riley | B25B 11/005 144/144.1 |
| 5,572,785 | A * | 11/1996 | Tveit | G02B 7/02 29/283 |
| 5,609,377 | A * | 3/1997 | Tanaka | B65G 47/918 901/46 |
| 6,463,644 | B1 * | 10/2002 | Pasque | B62D 65/026 269/21 |
| 9,487,361 | B2 * | 11/2016 | Girtman | B65G 59/02 |
| 2019/0030730 | A1 * | 1/2019 | Tanaka | B25J 13/087 |
| 2019/0091879 | A1 * | 3/2019 | Wagner | B25J 15/0616 |

OTHER PUBLICATIONS

Schmalz, Ergonomic Vacuum Lifters, [retrieved on Jul. 20, 2020] retrieved from the Internet URL: https://cdn.schmalz.com/media/05_services/catalog/mh/vacuum-lifters-Jumbo-and-VacuMaster.pdf, 52 pages.

* cited by examiner

METHOD AND SYSTEM FOR MANIPULATING ARTICLES

CROSS REFERENCE TO RELATED APPLICATIONS

The present application claims the benefit of priority to U.S. Provisional Patent Application No. 62/845,495, entitled "Bag And Case Handling Robotic Vacuum Tool," filed on May 9, 2019, the entirety of which is incorporated by reference herein.

TECHNOLOGICAL FIELD

Example embodiments of the present invention relates generally to a material handling system for handling items, and, more particularly, to an item manipulation system of the material handling system for manipulating one or more items in a material handling environment.

BACKGROUND

Material handling systems can convey, sort, and organize items (e.g. cartons, cases, containers, shipment boxes, totes, packages, and/or the like) at high speeds. Depending on a configuration of the material handling systems, the items may travel through the material handling systems in an unregulated manner in a material handling environment, or may be repositioned, reoriented, and/or consolidated into a single stream of items on conveyors and/or other locations. Material handling systems may rely on a conveyor controller and/or warehouse management system to organize items being conveyed and/or handled.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein, relates to methods and systems for manipulating items in a material handling environment. In some example embodiments, an item manipulation system is described. The item manipulation system comprises, a control system and an end effector. The end effector can be communicatively coupled to the control system. The end effector can comprise a tube defining a channel. The channel can be defined between a first end and a second end. Further, the tube can include, a flexible suction cup disposed within the channel of the tube. The flexible suction cup can be configured to engage a surface of the item based on vacuum suction force generated through the flexible suction cup. Further, the end effector can also comprise a linear actuator that can be mechanically coupled to the flexible suction cup. Furthermore, the linear actuator can be configured to: extend the flexible suction cup towards the second end of the channel to position at least a portion of the flexible suction cup outside the tube. Furthermore, the linear actuator can be configured to retract the flexible suction cup within the channel to position the flexible suction cup within the tube.

In some example embodiments, the control system of the item manipulation system can be configured to, actuate the flexible suction cup to grip a first item of a first body shape based on an engagement of a proximal end of the flexible suction cup with a surface of the first item. In this regard, the control system can actuate the flexible suction cup, upon positioning the at least portion of the flexible suction cup outside the tube.

In some example embodiments, the control system can be configured to actuate the flexible suction cup to grip a second item of a second body shape based on an engagement of a surface of the second item with the second end of the tube. In this regard, the control system actuates the flexible suction cup upon positioning, the flexible suction cup within the tube.

According to some example embodiments, the linear actuator of the end effector can be a pneumatic cylinder comprising a piston. In this aspect, a distal end of the flexible suction cup can be engaged to an end of the piston via an end shaft.

In some example embodiments, the control system can be configured to: identify characteristics of an item. In this regard, the characteristics of the item includes at least a body shape of the item. Further, the control system can be configured to actuate the linear actuator based on the identified characteristics of the item. In this regard, in some example embodiments, if the identified characteristics of the item corresponds to a flexible body shape of the item, the control system can be configured to cause the linear actuator to position the flexible suction cup within the tube of the end effector. Alternatively, in some example embodiments, if the identified characteristics of the item corresponds to a rigid body shape of the item, the control system is configured to cause the linear actuator to position at least the proximal end of the flexible suction cup outside the tube of the end effector.

In some example embodiments, the control system can be configured to at least cause to generate, via a vacuum generator, vacuum suction force through at least one of the tubes and the flexible suction cup.

According to some example embodiments, an end effector is described. The end effector comprises, a tube defining a channel between a first end and a second end. The tube includes a flexible suction cup disposed within the channel defined by the tube. The flexible suction cup can be configured to engage a surface of an item based on vacuum suction force generated through at least one of: the flexible suction cup and the channel defined by the tube. The end effector further comprises, a linear actuator mechanically coupled to the flexible suction cup. The linear actuator can be configured to: extend, the flexible suction cup towards the second end of the channel to position at least, a portion of the flexible suction cup outside the tube. Further, the linear actuator can be configured to retract, the flexible suction cup within the channel to position the flexible suction cup within the tube.

In some example embodiments, the end effector can be configured to pick a first item of a first body shape by engaging a surface of the item with the flexible suction cup based on vacuum suction force drawn through the flexible suction cup. Alternatively, in some example embodiments, the end effector can be configured to pick a second item of a second body shape by engaging the surface of the item with the second end of the tube based on vacuum suction force drawn through at least one of: the flexible suction cup and the channel defined by the tube.

In some example embodiments, the end effector includes an ejector adapted to release an item that can be engaged by the end effector by employing compressed air ejected through the ejector.

In some example embodiments, the end effector comprises a vacuum generation system that can be configured to generate vacuum suction force through a vacuum generator and draw, via a channel, the vacuum suction force through at least one of: the tube and the flexible suction cup.

In some example embodiments, the linear actuator of the end effector can be configured to position the flexible suction cup within the tube of the end effector, if characteristics identified for the item corresponds to a flexible body shape of the item. Further, the linear actuator can be configured to, position at least a portion of the flexible suction cup outside the tube of the end effector, if characteristics identified for the item corresponds to a rigid body shape of the item.

In accordance with some example embodiments described herein, an item manipulation system is described. The item manipulation system includes a control system and an end effector communicatively coupled to the control system. The end effector defines a first end configured to be engaged to a robotic tool. The end effector further defines a second end. The second defines an array of item grasping tools configured to engage with a surface of an item. In this aspect, a first set of item grasping tools from amongst the array of item grasping tools can be configured to be selectively actuated by the control system. In an aspect, the first set of item grasping tools can be selectively actuated to, extend, outwards from the second end and further from, a second set of the item grasping tools, remaining from amongst the array of item grasping tools, to engage with a surface of the item based on a vacuum suction force generated through the first set of the item grasping tools. In another aspect, the first set of item grasping tools can be selectively actuated to retract, towards the second end to position the first set of item grasping tools in-line with the second set of the item grasping tools. In this regard, upon retracting, at least one item grasping tool from amongst the second set of the item grasping tools can be configured to further engage with the surface of the item engaged to the first set of item grasping tools.

In some example embodiments, the array of the item grasping tools corresponds to one of: clamps, static grippers, electromagnetic grippers, electrostatic grippers, and vacuum suction cups.

According to some example embodiments, the control system of the item manipulation system can be configured to: access, from a vision system, a plurality of images of a material handling environment including a plurality of items. Further, based on processing the plurality of images, the control system can be configured to identify, a first item from amongst the plurality of items which is to be handled by the end effector. Furthermore, the control system can be configured to cause to actuate the first set of the item grasping tools to extend, outwards from the second end and further from a second set of the item grasping tools, to pick the first item based on an engagement of a surface of the first item with the first set of the item grasping tools.

In some example embodiments, upon picking the first item, the control system can be configured to cause to actuate the first set of item grasping tools to retract towards the second end to position the first set of item grasping tools back in line with the second set of the item grasping tools. Further, the control system can be configured to cause to actuate the at least one item grasping tool from amongst the second set of the item grasping tools to engage with the surface of the item.

According to some example embodiments, the item manipulation system also includes a vacuum generator adapted to generate vacuum suction force through one or more of the array of the item grasping tools. Further, the item manipulation system also includes an ejector adapted to release the item that can be engaged by the end effector based on employing compressed air ejected through the ejector.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
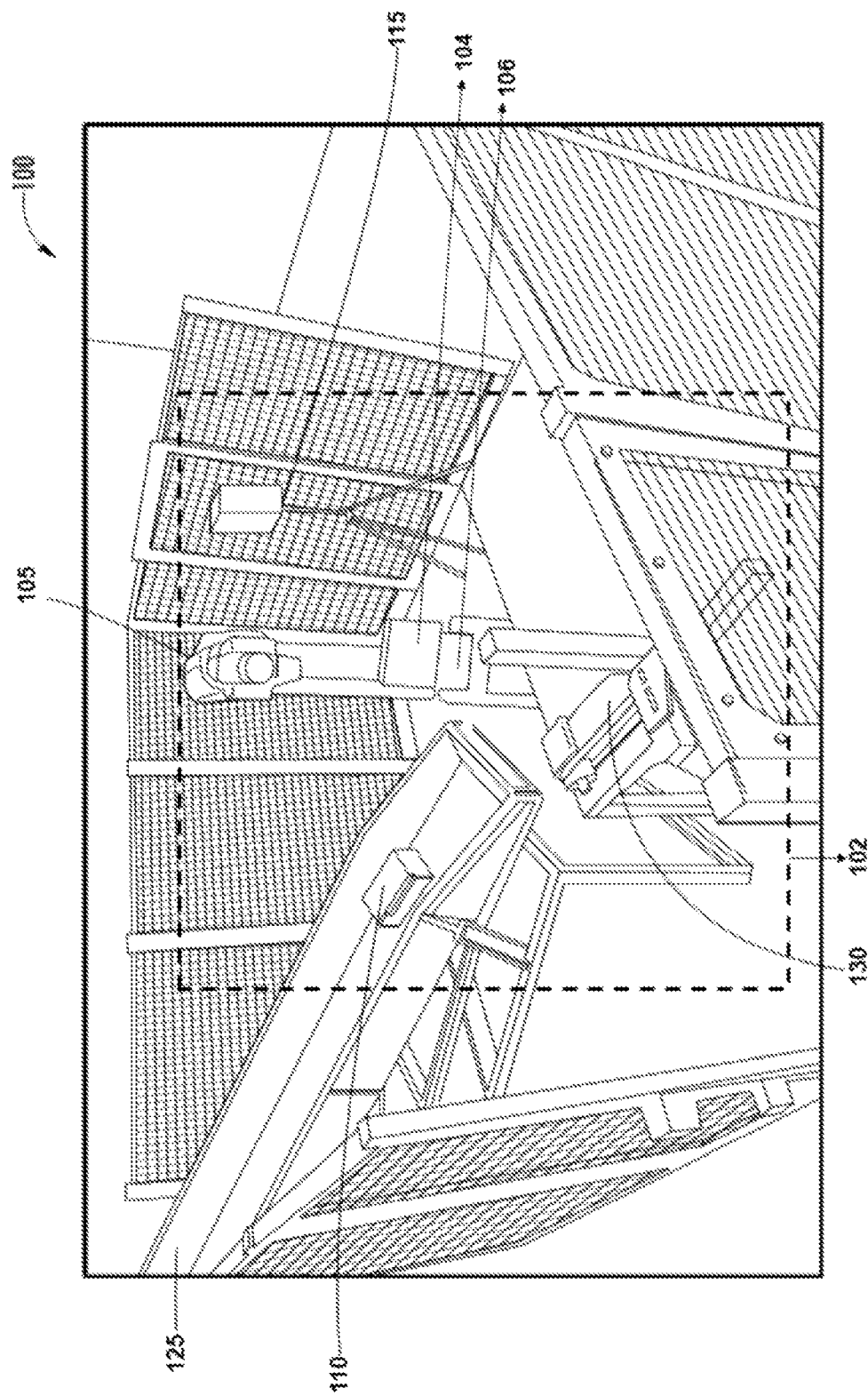
FIG. 1 illustrates a perspective view of a material handling system including an item manipulation system, in accordance with some example embodiments described herein.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

In a material handling environment, such as, but not limited to, distribution centers, warehouses, inventories, or shipping centers, various equipment such as, robotic arms, item manipulators, conveyor overhead units, and/or the like are used for performing various operations. For instance, the equipment can be used for manipulating items located in the material handling environment and/or in transit on some conveyors. Manipulation of the items referred herein, may involve performing operations such as, but not limited to, picking, re-orienting, placing, stacking, un-stacking, lifting, repositioning, or relocating the items. Generally, a material handling system may include one or more robotic tools that can be installed in the material handling environment, which can be configured to perform the manipulation of items. These robotic tools can be typically designed to pick items that can be of various body shapes. For instance, some robotic tools can be designed to pick flexible body shaped items like, envelopes, bags, packages. Similarly, some robotic tools can be designed to pick items having rigid body shape like, containers, totes, cartons etc. In this aspect, these robotic tools can include an end effector that can be configured to pick the item of a particular body shape.

Usually, it is desired to handle different types of items (i.e. items of different body shapes) at a faster rate. Handling of the items may include re-orientating the items, as in, when these items are inducted onto a sortation conveyor or a downstream conveyor, and being handled by equipment like robotic tools, sorters, or end effectors, within the material handling system. Further, manually changing orientation of each item on the conveyor can be time-consuming and may cause loss of overall productivity of operators. Also, switching between robotic tools each having different configuration of end effectors customized to handle items of different body shapes may be ineffective, as each such robotic tool requires a larger footprint and occupies extra space within the material handling environment. Further, it may also add to overall cost, and may slow down operations within the material handling environment, thereby impacting an overall throughput of the material handling system.

Also, it is generally desired to have an equipment that may manipulate items of different body shapes by re-orienting or re-positioning the item, without disrupting ongoing workflow or operations in the material handling environment. Further, in material handling environment for picking an item, particularly in cases, where the item is to be grasped from amongst a dispersion of many items, it may be desired to have an end effector having minimal area at a robotic end of the end effector which contacts the item for picking. Having said that, in some cases, where an object of high mass has to be handled by the end effector which may be of a smaller area at the robotic end and may provide a smaller contact interface with the item, there may be situations when the end effector is not able to develop sufficient grasp quality and strength to engage the item for picking and further perform high force maneuvers. Thus, for cases, where the robotic end of the end effector is to reach into a pile of many items, for instance, to pick a small sized item from amongst a pile of big sized items, it may be desired to have an end effector having a smaller diameter of the robotic end tool or that occupies lesser footprint in the material handling environment. Alternatively, in other cases, where the end effector is handling big sized items, a larger diameter of the robotic end of the end effector may be desired for effectively manipulating the item, for instance, ensuring a stable lifting of the item.

Various example embodiments described herein relates to, an item manipulation system for manipulating items of various body shapes. The item manipulation system comprises, a control system and an end effector that may be communicatively coupled to the control system. In some example embodiments, the end effector may include a tube that can define a channel between a first end and a second end. The tube can comprise, a flexible suction cup disposed within the channel of the tube. In accordance with said example embodiments, the flexible suction cup can be configured to engage a surface of the item based on vacuum suction force generated through the flexible suction cup. Further, the end effector can comprise a linear actuator, for example, a pneumatic cylinder, that can be mechanically coupled to the flexible suction cup.

According to some example embodiments, the linear actuator can be configured to actuate thereby, extending the flexible suction cup towards the second end of the channel so as to position at least a portion of the flexible suction cup outside the tube. In this aspect, the upon positioning the at least portion of the flexible suction cup outside the tube, the control system may cause to actuate the flexible suction cup to grip a first item of a first body shape (e.g. a rigid body shaped item). The flexible suction cup may grip the first item based on an engagement of a proximal end of the flexible suction cup with a surface of the first item.

Further, according to said example embodiments, the linear actuator can be configured to actuate thereby, retracting the flexible suction cup within the channel to position the flexible suction cup within the tube. In this regard, upon positioning, the flexible suction cup within the tube, the control system may cause to actuate the flexible suction cup to grip a second item of a second body shape (e.g. a flexible body shaped item). The flexible suction cup may engage the second item based on an engagement of a surface of the second item with the second end of the tube.

In some examples, the first item may be of a rigid body shape (e.g., a box, tote, container, cart, carton, and/or the like) and the second item may be of a flexible body shape (e.g., a package, a bag, paper bag, poly bag, and/or the like). Thus, the item manipulation system described herein in accordance with various example embodiments, provides an effective handling (e.g. gripping) of items of different body shapes without a requirement of switching between multiple robotic tools or separate configurations of end effectors. Further, as the end effector includes one flexible suction cup which may be moved within the tube or outside the tube to handle items of varying body shapes, overall, the end effector has a smaller footprint and items of different body shape can be handled, without disrupting ongoing operations of the material handling system.

According to another example embodiment described herein, an item manipulation system comprises an end effector having an array of item grasping tools (for example multiple flexible suction cups). In this aspect, a control system of the item manipulation system may selectively actuate a first set of item grasping tools, from amongst the array of item grasping tools. The first set of item grasping tools can be actuated to extend further from the array of item grasping tools to pick an item based on an engagement of the item with the first set of item grasping tools. In this regard, in some examples, the first set of item grasping tools may be extended further from remaining of the item grasping tools in the array, to pick the item from amongst a pile of items positioned within a material handling environment. Further, in accordance with said example embodiments, the control system may actuate the first set of item grasping tools to retract back the first set of item grasping tools in-line (i.e. along a same plane) with remaining item grasping tools in the array of the item grasping tools. In accordance with said example embodiments, the remaining item grasping tools may further engage with the item engaged with the first set of item grasping tools to additionally support the item, (i.e. by extending an item grasp area which interfaces with the item for engagement), during a maneuvering of the item by the end effector.

Having described an example embodiment at a high level, the design of the various devices performing various example operations is provided below.

FIG. 1 illustrates a perspective view of a material handling system 100 comprising an item manipulation system 102. The material handling system 100 may handle items of various body shapes, for instance, rigid body shaped items, thin body shaped items, flexible body shaped items, and/or the like. The material handling system 100 may include a variety of components and/or subsystems, such as an induction conveyor, a sortation system, chutes, identification systems, vision systems, robotic subsystems, and/or the like, for handling and processing items.

According to some example embodiments, the material handling system 100 may correspond to an industrial environment set-up that may typically include various conveying arrangements, inter alia, a plurality of conveyors as exemplary supply arrangements for conveying items (e.g. shipment containers, totes, parcels, packages, cartons, and/or the like) from one location to another. In some examples, the material handling environment may also include sorters for sorting the items. Further, in some examples, the material handling environment may include various units like, but not limited to, scanners, imagers, actuators, controllers, robotic manipulators, and/or the like to perform one or more functions such as, but not limited to, detecting one or more addresses written on shipment containers, handling the containers, guiding the containers by means of various conveying units, weighing the containers, encoding data on labels affixed to the containers, etc.

In accordance with some example embodiments, the material handling system 100 can comprise, the item manipulation system 102 that may be configured to manipulate an item 110 from a first orientation to a second orientation. The item manipulation system 102 comprise a robotic tool, such as a repositioning system 105, for handling and repositioning items of different body shapes. For example, the repositioning system 105 may be configured to pick the item 110 in a first orientation from a chute 125 and/or a conveyor (not shown), and further reorient and/or reposition the item 110 to a second orientation for placement onto a conveyor and/or any downstream subsystem of the material handling system 100. In some examples, the repositioning system 105 may pick an item from a first orientation in which a label (e.g. including a barcode or a QR code) on the item is facing downwards and may reposition the item to a second orientation in which the label on the item is facing upwards towards a ceiling. The repositioning system 105 can reposition the item in any orientation that may be same or different from its previous orientation. According to some example embodiments described herein, the repositioning system 105 can comprise a robotic arm 104 and an end effector 106 for manipulating the item 110. The end effector 106, described in accordance with various example embodiments herein, may define two ends, a first end engaged mechanically with the robotic arm 104 and a second end defining one or more item grasping tools (not shown) for gripping items of different body shapes. Further details of the end effector 106 and the one or more item grasping tools, are described hereafter with reference to FIGS. 2-9.

Further, in accordance with said example embodiments, the material handling system 100 also includes a vision system 115 having one or more sensors positioned at locations within the material handling system 100. The vision system 115 may be configured to generate inputs corresponding to one or more characteristics of the item 110. It should be noted that the vision system 115 is shown as a standalone camera in FIG. 1, however, the vision system 115 is not limited to the implementation shown in FIG. 1. The vision system 115 may also include a network of imagers, sensors, cameras, identification systems, and the like for determining characteristics of one or more items in the material handling system 100. In accordance with the embodiments of the present disclosure, the characteristics of the item 110 may include a body type, body shape, size, weight, position, edge detection, marker detection, label detection, orientation, and/or the like. In some example embodiments, the vision system 115 may capture an image of an item to identify a body shape of the item (e.g. item with a rigid body shape or a flexible body shape). For example, the vision system 115 may identify characteristics associated with the item to be of a first type, i.e. having a rigid body shape (e.g. items like cartons, boxes, totes etc.) In another example, the vision system 115 may identify characteristics associated with the item to be of a second type, i.e. having a flexible body shape (e.g. items like polybags, poly-packages, etc.).

According to some example embodiments, the characteristics of the item 110 may be used to control and operate one or more subsystems (e.g., the repositioning system 105, the control system (not shown), the robotic arm 104, and/or the end effector 106) of the material handling system 100. In accordance with said example embodiments, the item manipulation system 102 also can include equipment such as a control system (not shown). In accordance with said example embodiments, the control system may include a controller (not shown) in communication with the equipment in the material handling system 100 (e.g., the repositioning system 105, the robotic arm 104, the end effector 106, and/or the vision system 115). The controller may include at least one processor that may execute instructions to cause the item manipulation system to perform specific operations.

In some example embodiments, the control system may include a processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, the control system can include one or more of, an integrated circuit, an application-specific integrated circuit (ASIC), a digital signal processor (DSP), a field-programmable gate array (FPGA), a programmable logic controller (PLC), a complex programmable logic device (CPLD), a discrete gate or transistor logic, discrete hardware components, or any combination thereof designed to perform the functions described herein. In some examples, the control system can also exploit Nano-scale architectures such as, but not limited to, molecular and quantum-dot based transistors, switches and gates, in order to optimize space usage or enhance performance of one or more components of the material handling system 100.

In accordance with the embodiments of the present disclosure, the processor may execute instructions to cause the vision system 115 to determine characteristics such as, but not limited to, body type, body shape (e.g., rigid, flexible, and/or the like) of the item 110 to be conveyed. The processor may further execute instructions to cause the repositioning system 105 to pick, via the end effector 106, the item 110 in the first orientation and re-position the item 110. Further, the processor may execute instructions to cause the repositioning system 105 to move the robotic arm 104, to reposition the item 110 in the first orientation or a second orientation for placement onto a conveyor 130, such as a downstream conveyor within the material handling system 100.

As described above, the repositioning system 105 may include at least one of a robotic tool that includes the robotic arm 104 and the end effector 106. In accordance with various example embodiments, the end effector 106 can comprise one or more item grasping tools (e.g., clamps, static grippers, electromagnetic grippers, electrostatic grippers, flexible suction cups, and/or the like) for handling items of different body types and/or repositioning the item 110. The item manipulation system 102, the end effector 106, and their associated operations are explained hereinafter in further details with reference to FIGS. 2-9.

Figure 2:
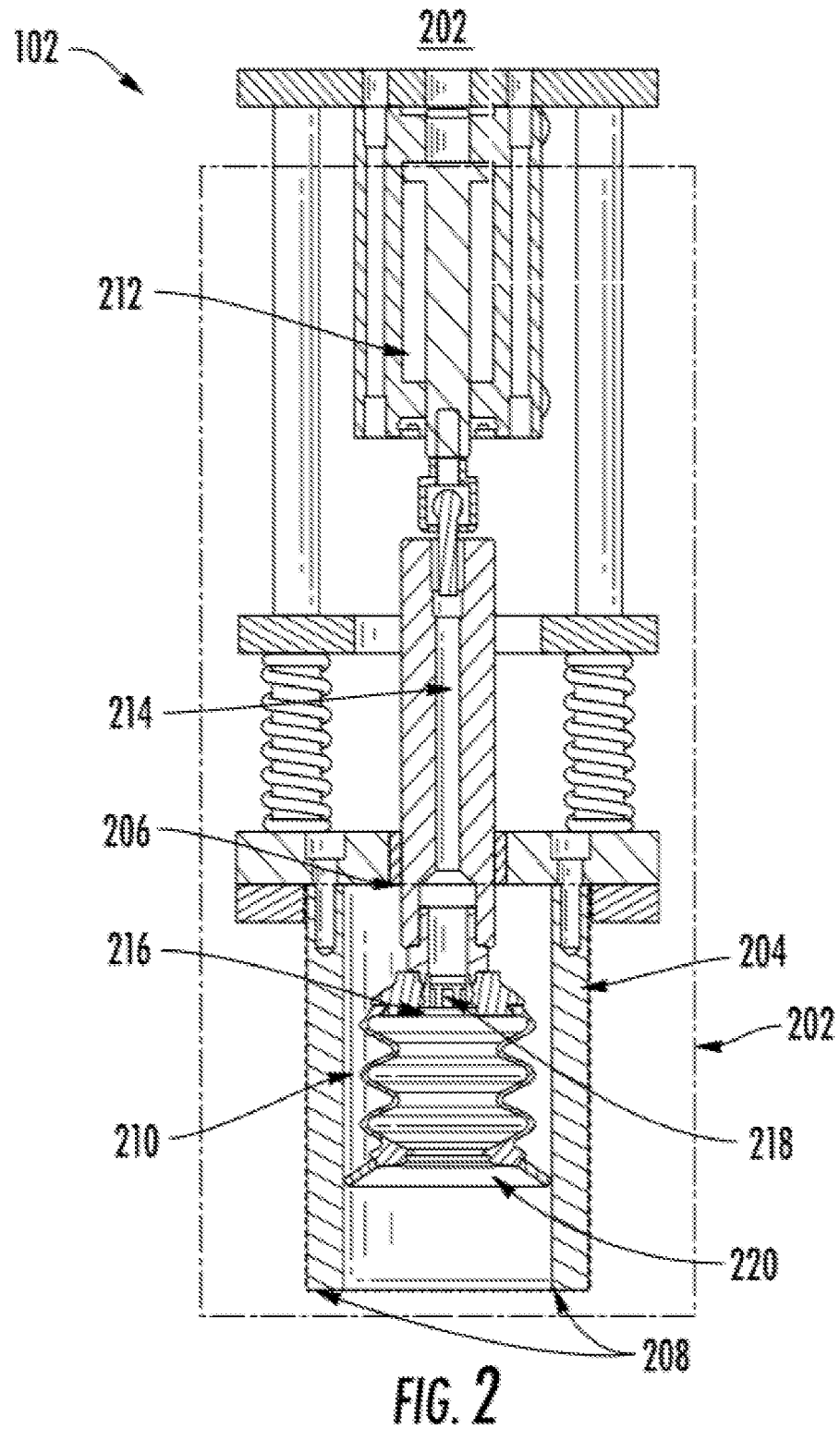
FIG. 2 illustrates a sectional view of the item manipulation system having an end effector positioned in a first orientation, in accordance with some example embodiments described herein.
Figure 3:
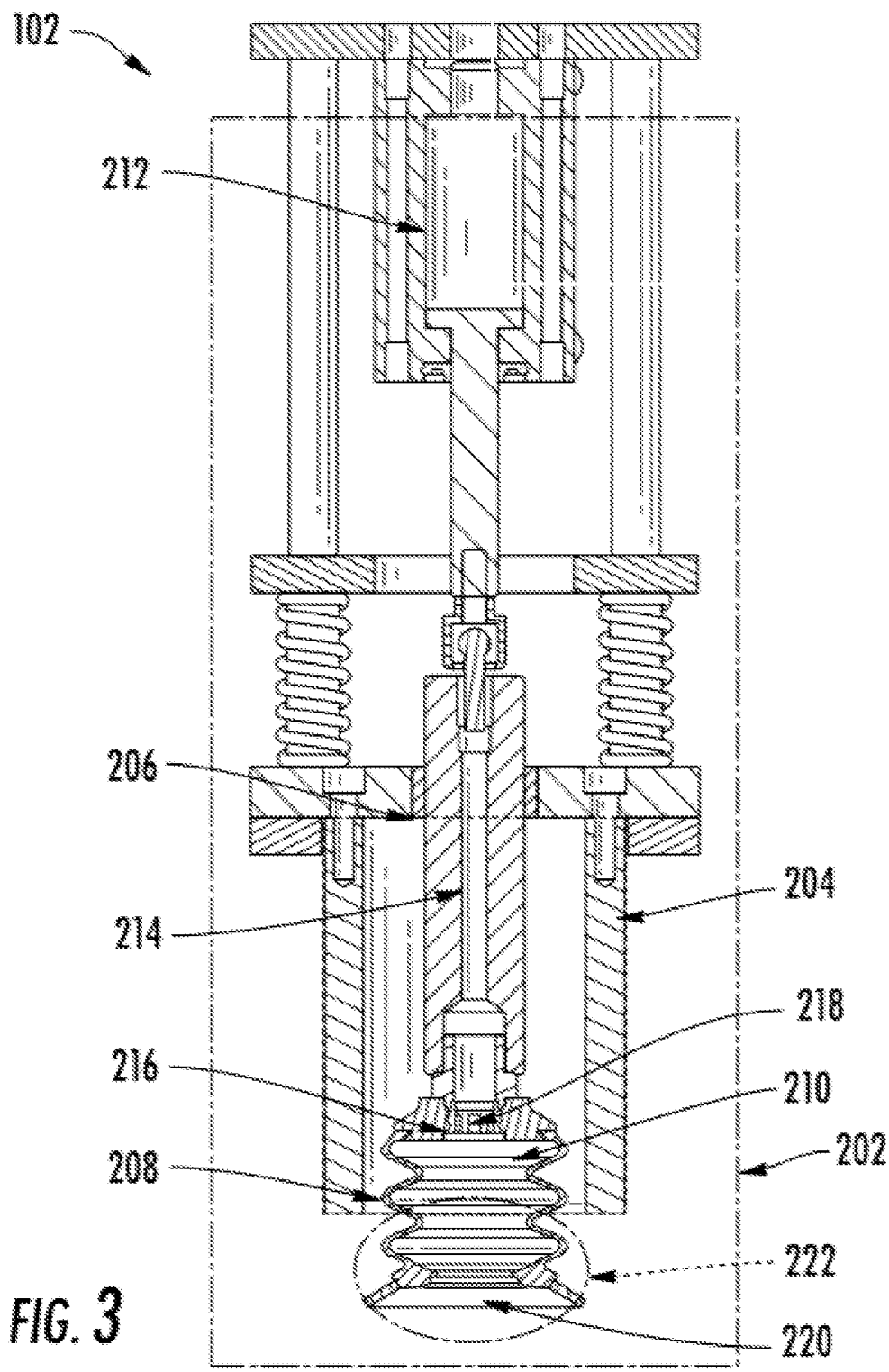
FIG. 3 illustrates another sectional view of the item manipulation system having the end effector positioned in a second orientation, in accordance with some example embodiments described herein.

FIGS. 2 and 3 illustrates sectional views of the item manipulation system 102 having an end effector 202 positioned in a first orientation and a second orientation, respectively, in accordance with some example embodiments described herein. In an example, in the first orientation, the end effector 202 can be configured to handle items having a body shape of second type e.g. flexible body shaped items like, but not limited to, polybags, plastic bags etc. In another example, in the second orientation, the end effector 202 can be configured to handle items having a body shape of a first type, e.g. rigid body shaped items like, but not limited to, cartons, totes, boxes etc.

In an example embodiment, the end effector 202 may be communicatively coupled to a control system (not shown). As shown, the end effector 202 can comprise a tube 204. The tube 204 can define a channel between a first end 206 and a second end 208. In accordance with said example embodiments, the tube 204 can include a flexible suction cup 210.

In some examples, the flexible suction cup 210 can be engaged to an actuator element, e.g. a shaft of a linear actuator. The flexible suction cup 210 can be movably positioned within the channel of the tube 204. As illustrated in FIG. 2, in the first orientation of the item manipulation system 102 the flexible suction cup 210 can be positioned within the channel defined by the tube 204. Further, as illustrated in the FIG. 3, in the second orientation, at least a portion of the flexible suction cup 210 can be positioned outside the channel defined by the tube 204. To this end, the linear actuator may actuate the shaft to move the portion of the flexible suction cup 210 outside the channel of the tube 204.

According to various example embodiments described herein, the flexible suction cup 210 may be configured to engage with a surface of an item based on vacuum suction force generated through the flexible suction cup 210.

In accordance with said example embodiments, as illustrated, the end effector 202 can include a linear actuator 212 (e.g., but not limited to, a pneumatic cylinder or an air cylinder or a hydraulic cylinder). In some example embodiments, the linear actuator 212 may be positioned partially or completely within the tube 204. Alternatively, in some example embodiments, the linear actuator 212 may be outside the tube 204. According to said example embodiments, the linear actuator 212 may include a piston and may be mechanically coupled to the flexible suction cup 210. For instance, in some example embodiments, a piston of the linear actuator 212 may be mechanically coupled to an end shaft 214 that may be further coupled to a distal end 216 of the flexible suction cup 210. In this regard, according to some example embodiments, the distal end 216 of the flexible suction cup 210 may mounted over a connector element 218 coupled to the end shaft 214. Alternatively, in some example embodiments, the linear actuator 212 may be directly connected to the flexible suction cup 210, where the distal end 216 of the flexible suction cup 210 may be mounted over an end of the piston of the linear actuator 212. As described earlier, the linear actuator 212 can be configured to move the flexible suction cup 210 within and/or outside of the channel defined by the tube 204.

In accordance with various example embodiments described herein, referring to FIG. 3, in a second orientation of the end effector 202, the linear actuator 212 can be configured to actuate the end shaft 214 to extend, the flexible suction cup 210 towards the second end 208 of the channel. Illustratively, the flexible suction cup 210 may be extended to position at least a portion 220 of the flexible suction cup 210 outside of the tube 204. Further, according to said example embodiments, in a first orientation of the end effector 202, the linear actuator 212 can be configured to actuate the end shaft 214 to retract the flexible suction cup 210 within the channel to position the flexible suction cup 210 within the tube 204, as shown in FIG. 2.

In accordance with various example embodiments, the linear actuator 212 may actuate the end shaft 214 to position the flexible suction cup 210 within the tube 204 (as shown in FIG. 2) or at least a portion 220 (e.g. a proximal end) of the flexible suction cup 210 outside the tube 204 (as shown in FIG. 3). In this regard, in accordance with said example embodiments, the flexible suction cup 210 may be positioned within the tube 204, for cases, where the end effector 202 may pick an item having a flexible body shape (e.g. polybags, paper bags, bags, packages, and/or the like). In such cases, the end effector 202 may pick the flexible body shaped item based on an engagement of a surface of the item with the second end 208 (e.g. lip or cross section at the second end 208 of the tube 204). The engagement of the item may occur based on vacuum suction force generated through the flexible suction cup 210 positioned within the tube 204.

Alternatively, referring to FIG. 3, in some example embodiments, at least the portion 220 of the flexible suction cup 210 may be positioned outside the tube 204, for cases, where the end effector 202 has to pick an item having a rigid body shape (e.g., boxes, cartons, cart, totes, containers, and/or the like). In such cases, the end effector 202 may pick the rigid body shaped item based on an engagement of a surface of the item with a proximal end (e.g. at least the portion 220) of the flexible suction cup 210. The engagement of the item may occur based on vacuum suction force generated through the flexible suction cup 210.

In accordance with various example embodiments described herein, an amount of vacuum suction force generated through the flexible suction cup 210 and/or the tube 204, may depend on a type of the item and/or a size of the item. Alternatively, in some embodiments, same amount of vacuum suction force may be generated through the flexible suction cup 210 and/or the tube 204, irrespective of the type and/or the size of the item 110.

In accordance with various example embodiments described herein, in the second orientation of the end effector 202 illustrated in FIG. 2, the end effector 202 may pick a first item of a first body shape (e.g., a rigid body shaped item) by engaging a surface of the item with the flexible suction cup 210 based on vacuum suction force drawn through the flexible suction cup 210. Further, in the first orientation of the end effector 202 as illustrated in FIG. 3, the end effector 202 may pick a second item of a second body shape by engaging the surface of the item with the second end 208 of the tube 204 based on vacuum suction force drawn through at least one of: the flexible suction cup 210 and the channel defined by the tube 204.

Thus, by way of implementation of various example embodiments described herein, the end effector 202 including the flexible suction cup 210 can be used as a picking tool with relatively smaller footprint compared to conventional packet picking tools, that can work for picking both (a) rigid items e.g. boxes by using vacuum force generated through the flexible suction cup 210 and (b) flexible items e.g. bags, polybags. To this end, by interfacing the flexible suction cup 210 with the linear actuator 212, the flexible suction cup 210 can be moved in and out of the tube 204 so as to position the end effector 202 in a configuration that may be desired according to a type (i.e. body shape) of the item. In this regard, as described earlier, when out of the tube, the flexible suction cup 210 can adhere to handle items like, boxes, cartons, totes etc. Further, when inside of the tube, the flexible suction cup 210 can pull part of an item e.g. a bag into the tube 204 and effectively pick the item.

Figure 4:
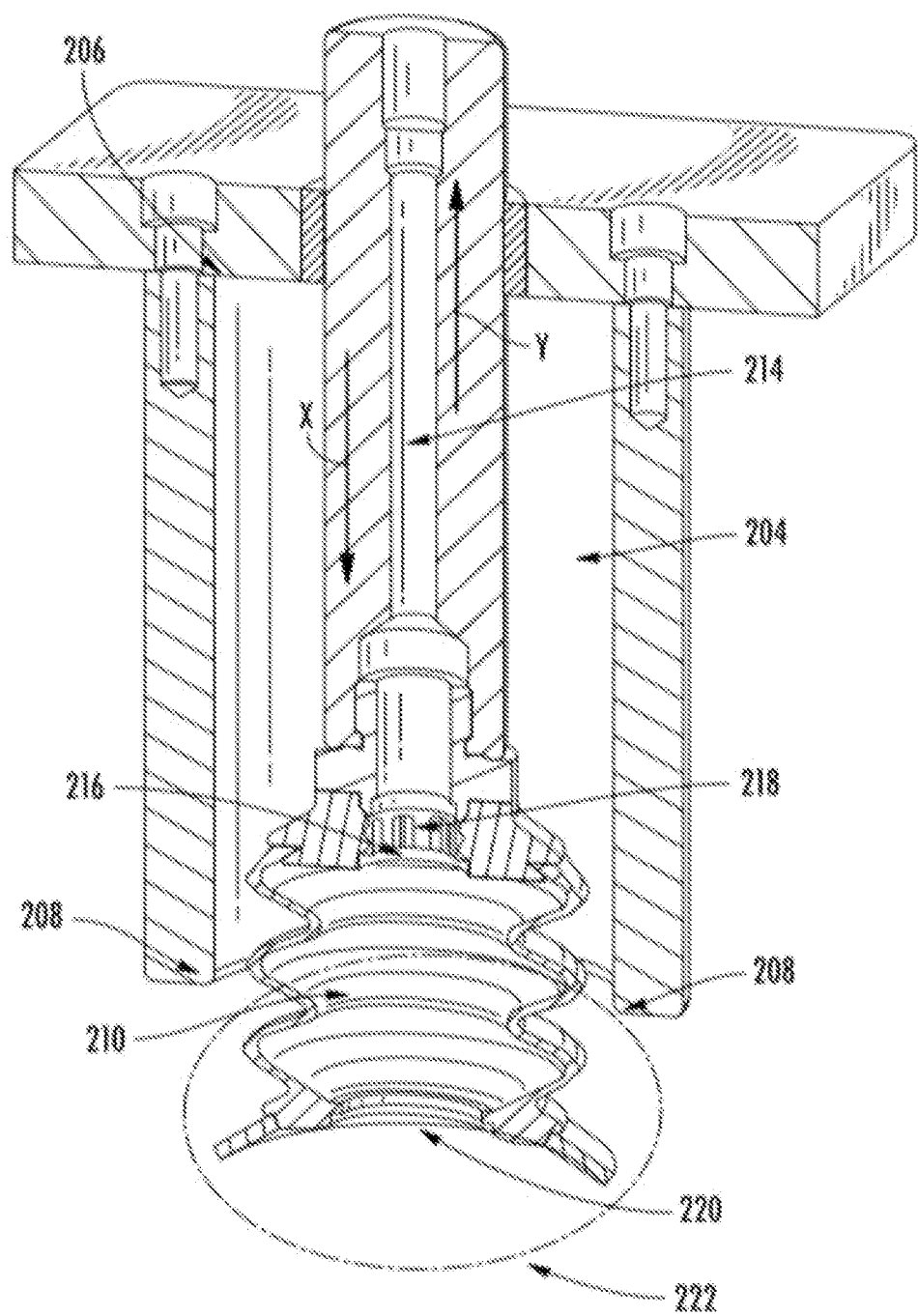
FIG. 4 illustrates a sectional view depicting an engagement of the end effector with a linear actuator of the item manipulation system, in accordance with some example embodiments described herein.

FIG. 4 illustrates a sectional view depicting an engagement of the end effector 202 with the linear actuator 212 of the item manipulation system 102. According to said example embodiments, the linear actuator 212 may actuate the end shaft 214 to move either, in direction X towards the second end 208 of the tube 204 or in direction Y towards the first end 206 towards the first end 206 of the tube 204. As shown, the end shaft 214 is mechanically engaged to the connector element 218 which is further connected to the distal end 216 of the flexible suction cup 210. Thus, as the linear actuator 212 moves the end shaft 214 in the direction X, the flexible suction cup 210 is extended towards the second end 208 of the tube 204. Said differently, as the linear actuator 212 actuates to extend the flexible suction cup 210, at least the portion 222 of the flexible suction cup 210 can be moved outside of the tube 204. Further, as the linear actuator 212 moves the end shaft 214 in the direction Y, the flexible suction cup 210 is retracted towards the first end 206 of the tube 204. In other words, the flexible suction cup 210 can be repositioned within the tube 204.

According to some example embodiments described herein, the end effector 202 may also include a vacuum generation system comprising one or more vacuum generators. Alternatively, in some example embodiments, one or more vacuum generators may be external to the end effector 202. The one or more vacuum generators may be configured to generate vacuum suction force and draw, via one or more channels (e.g. plenum, rods, etc.) the vacuum suction force through at least one of: the tube 204 and the flexible suction cup 210. In this aspect, each of the tube 204 and the flexible suction cup 210 may be in fluidic communication with the one or more vacuum generators through the one or more channels. Operations of the one or more vacuum generators including an amount of vacuum suction force required to be generated may be controlled by the control system of the item manipulation system 102.

Figure 5:
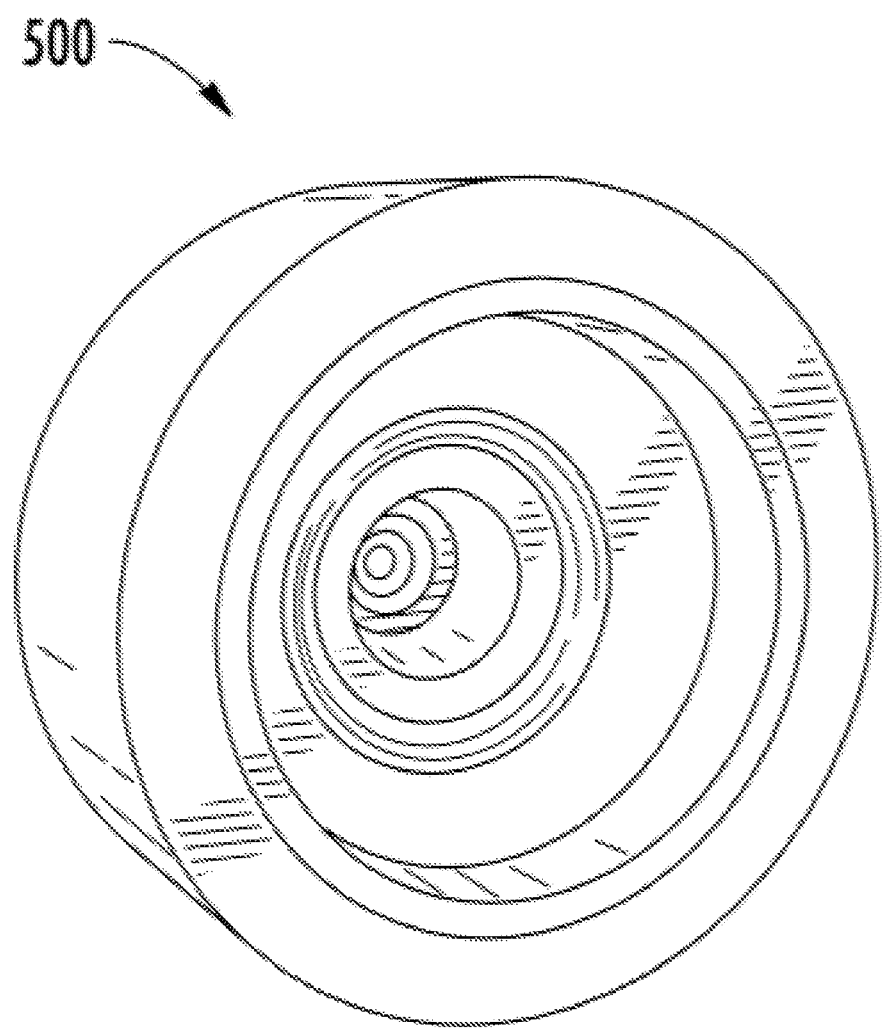
FIG. 5-7 illustrates multiple perspective views of the end effector of the item manipulation system, in accordance with some example embodiments described herein.
Figure 6:
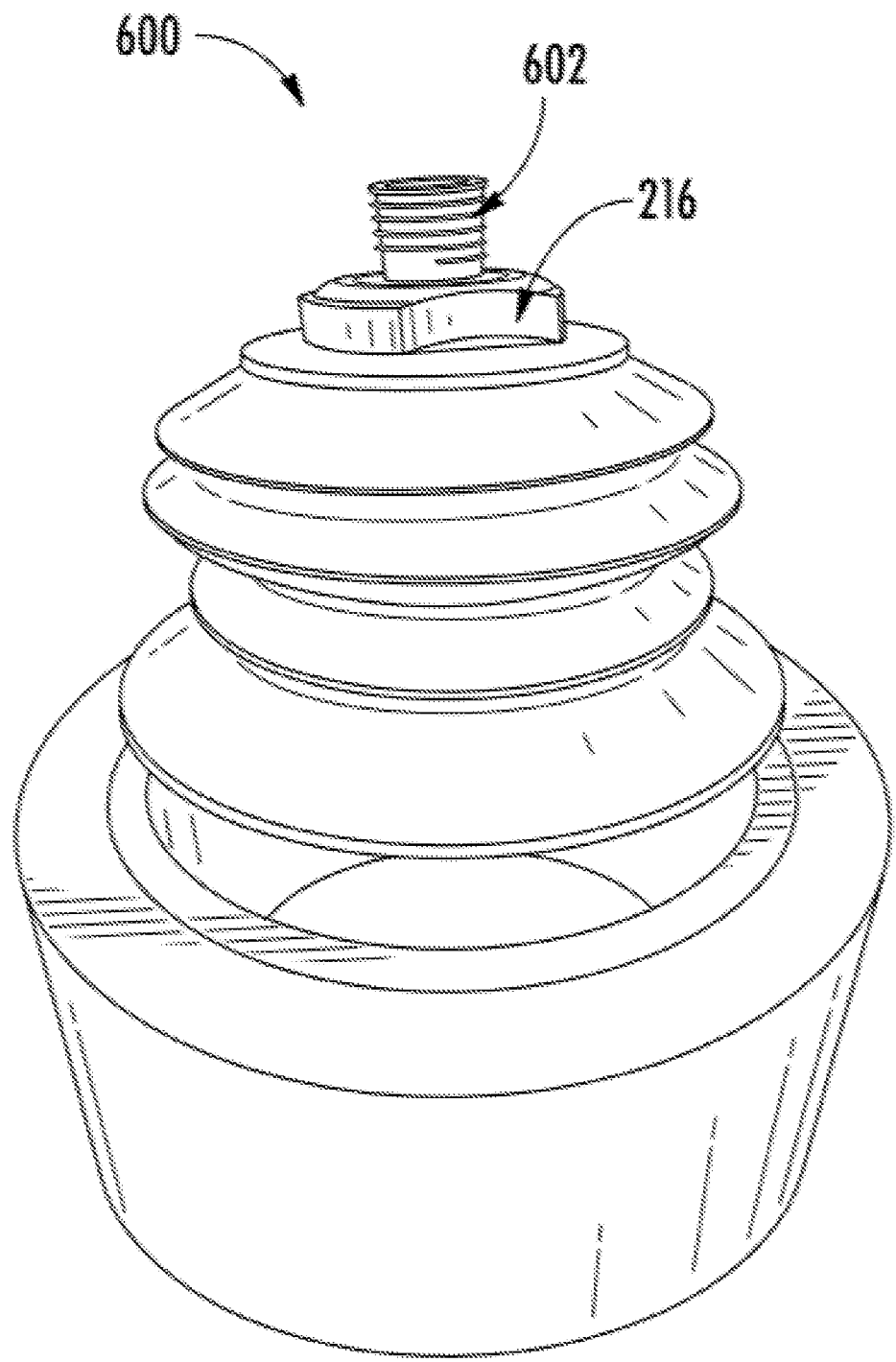
Figure 7:
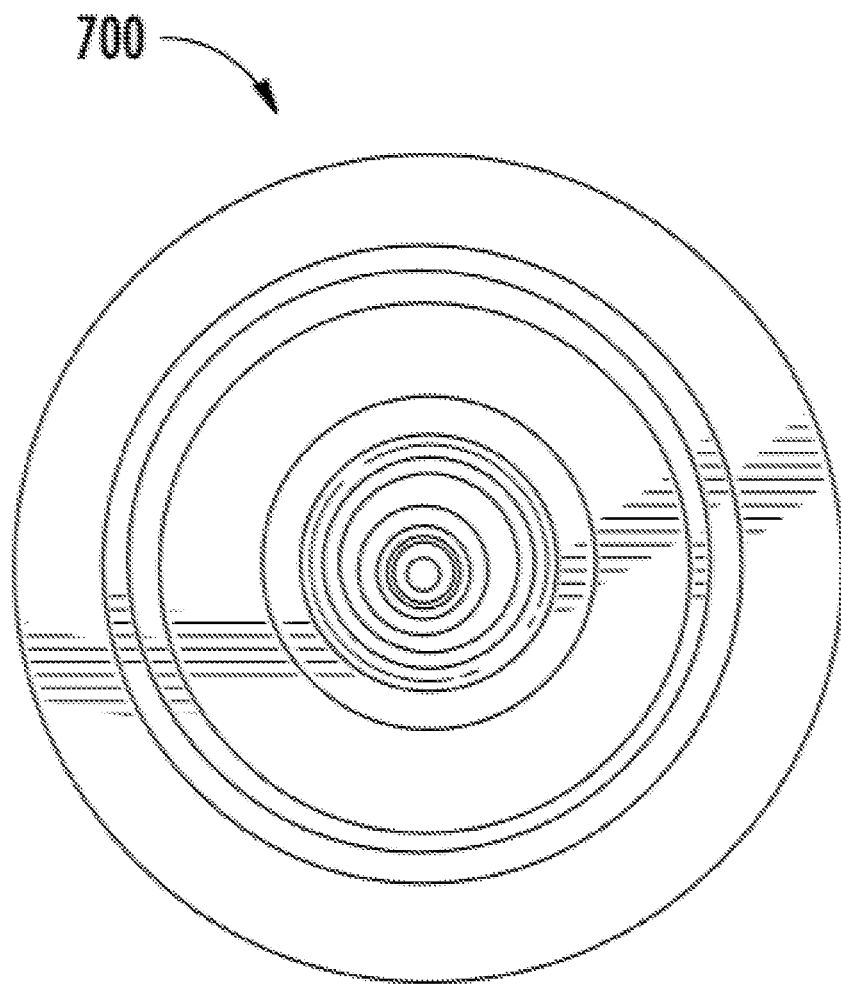

FIG. 5-7 illustrates multiple perspective views of the end effector 202 of the item manipulation system 102, in accordance with some example embodiments described herein. FIGS. 5 and 7 illustrates perspective views 500 and 700 of a portion of the end effector 202 including the flexible suction cup 210 that can be movably disposed within the tube 204 of the end effector 202. FIG. 6 illustrates a perspective view 600 of the flexible suction cup 210. As illustrated, the distal end 216 of the flexible suction cup 210 can include one or more threadings 602 which may facilitate engagement (for example, fastening) of the flexible suction cup 210 with the connector element 218 of the end effector.

Figure 8:
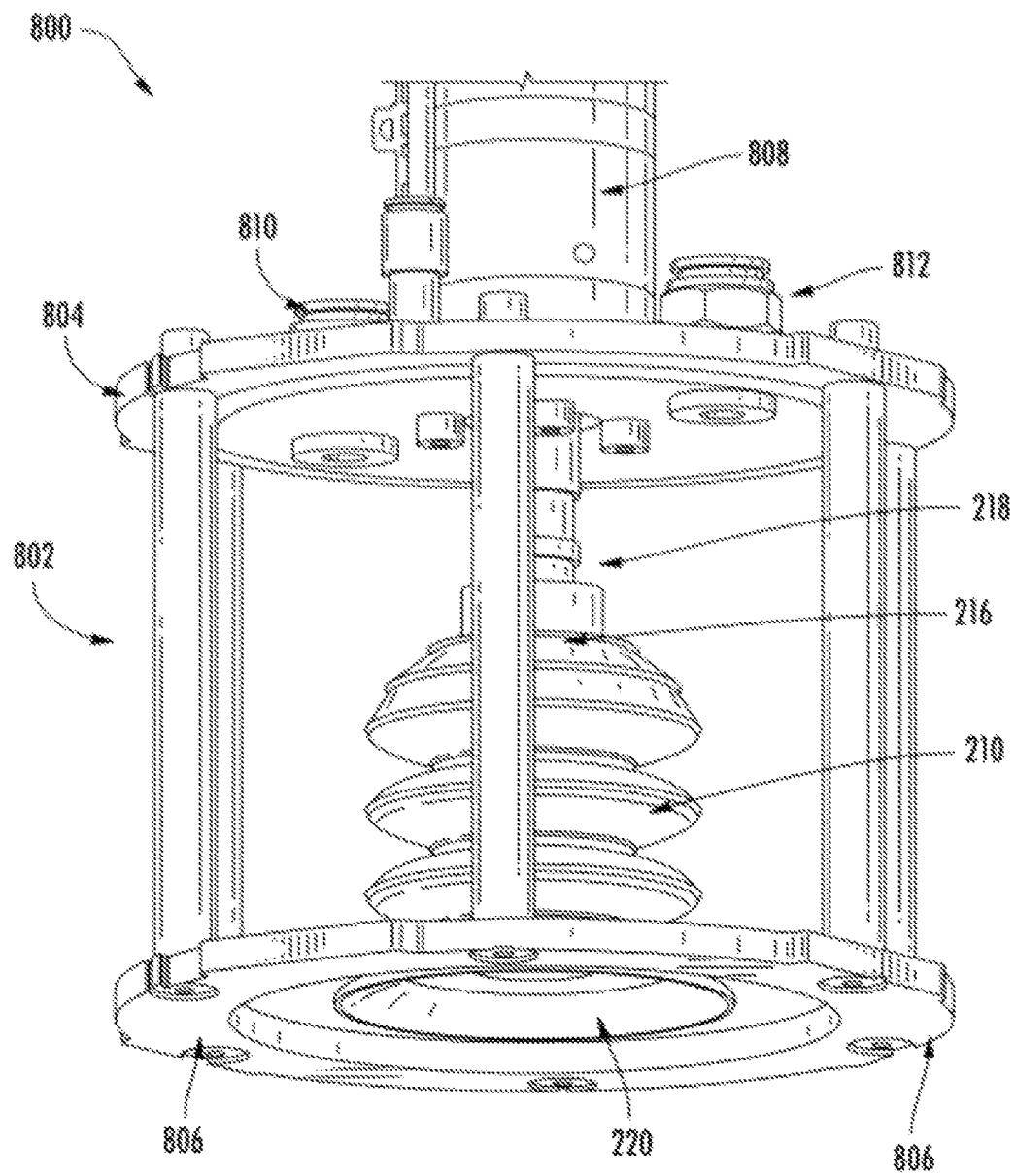
FIG. 8 illustrates a perspective view an item manipulation system having another end effector, in accordance with some example embodiments described herein.

FIG. 8 illustrates a perspective view the item manipulation system 102 having another end effector 800, in accordance with some example embodiments described herein. According to some example embodiments, the end effector 800 may comprise a tubular casing 802 having a flexible suction cup that can be movably positioned within a channel defined by the tubular casing 802. Illustratively, the tubular casing 802 can be defined between a first end 804 and a second end 806. The first end 804 of the tubular casing 802 may be connected, via an end shaft 808, to a robotic arm of the end effector 800 or the item manipulation system 102. As shown, in some example embodiments, the first end 804 of the tubular casing 802 can be connected to the end shaft 808 which may be further connected to an actuator (e.g. the linear actuator 212), as described previously. In some example embodiments, the end shaft 808 may be connected via the connector element 218 to the distal end 216 of the flexible suction cup 210. In an example embodiment, upon actuation of the actuator, the end shaft 808 coupled to the actuator may move towards the second end 806 of the tubular casing 802, thereby, extending the flexible suction cup 210 towards the second end 806 and/or further extending at least a portion of the flexible suction cup 210 outside of the tubular casing 802. Similarly, the end shaft may be retracted backwards by the linear actuator 212 towards the first end 804 of the tubular casing 802, thereby moving back the flexible suction cup 210 within the tubular casing 802.

In accordance with said example embodiments, a piping connected to one or more vacuum generators, may through pass, via a channel, defined by the end shaft 808, the connector element 218, and the flexible suction cup 210 respectively, to draw vacuum force generated by one or more vacuum generators, through the flexible suction cup 210. Further, the tubular casing 802 of the end effector 800 may also include inlets such as, a first inlet 810 and a second inlet 812 defined on the first end 804 of the end effector 800. The first inlet 810 and the second inlet 812 may be connected to the one or more vacuum generators or separate vacuum generators, via its respective piping. In this regard, vacuum suction force may be drawn into the tubular casing 802 through the first inlet 810 and the second inlet 812.

In accordance with said example embodiments, in some cases, the end shaft 808 upon actuation by the linear actuator 212 can extend at least the portion 220, for instance, the proximal end of the flexible suction cup 210, outside a cross section defined at the second end 804 of the tubular casing 802. In this regard, the flexible suction cup 210 can be extended outside of the tubular casing 802 to pick items of a first body shape (e.g. rigid body shape) by the end effector 800. To this extent, the item can be picked by the end effector 800 based on engagement of a surface of the item of the first body shape with the proximal end of the flexible suction cup 210, based on vacuum suction force generated through the flexible suction cup 210. Alternatively, in some cases, the end shaft 808 upon actuation by the linear actuator 212 can retract the flexible suction cup 210 within the tubular casing 802, (for instance, in cases, where the flexible suction cup 210 is already extended outside of the tubular casing 802). In this regard, a second item of a second body shape (e.g. flexible body shaped item) may be picked by the end effector 800 based on engagement of a surface of the second item with the second end 806 (i.e. a lip or a cross section defined by the second end 806) of the tubular casing 802. In accordance with said example embodiments, the engagement may be based on vacuum suction force generated through vacuum suction force drawn through at least one of the flexible suction cup 210 and/or the tubular casing 802 via the inlets, i.e. the first inlet 810 and/or the second inlet 812.

Figure 9:
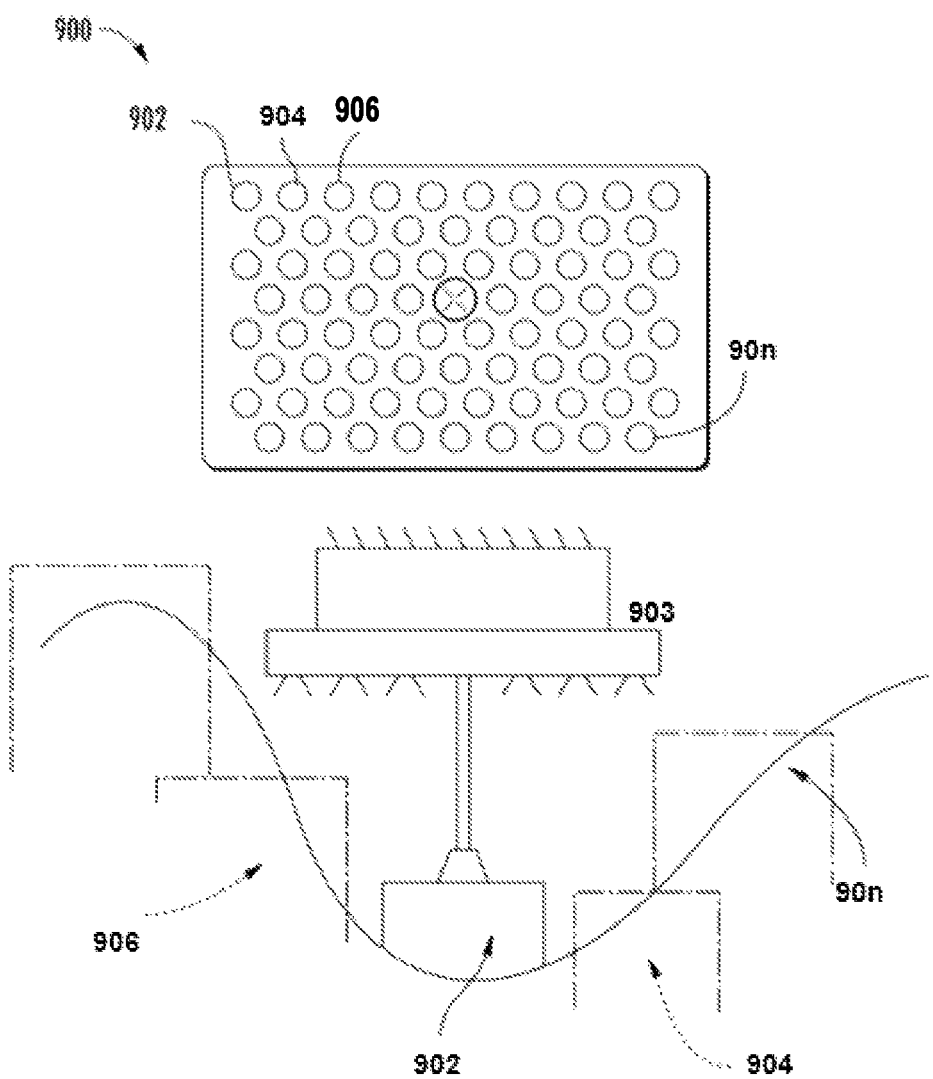
FIG. 9 illustrates an item manipulation system comprising an end effector having a plurality of item grasping tools, in accordance with some example embodiments described herein.

FIG. 9 illustrates another item manipulation system comprising an end effector 900. In accordance with some example embodiments, the end effector 900 can comprise a plurality of item grasping tools 902, 904, 906 . . . 90*n* that may be arranged in an array (i.e. next to one another at a pre-defined gap). The end effector 900 may be defined between two ends, a first end (not shown) and a second end 903. In some example embodiments, the first end of the end effector 900 may be connected to a robotic arm (not shown) of the item manipulation system (for instance, the item manipulation system 102). As shown, the end effector 900 at its second end 903 can include the plurality array the item grasping tools, viz. 902, 904, 906 . . . 90*n*. In accordance with various example embodiments described herein, the item grasping tools 902, 904, 906 . . . 90*n* may correspond to one or more of: clamps, static grippers, electromagnetic grippers, electrostatic grippers, vacuum suction cups, and/or a combination thereof. In some examples, each of the item grasping tool 902, 904, 906 . . . 90*n* may include a flexible suction cup (e.g. the flexible suction cup 210, as described earlier, in reference to FIGS. 2-4).

In accordance with some example embodiments, each item grasping tool of the item grasping tools 902, 904, 906 . . . 90*n* may be coupled to a respective actuator (e.g. pneumatic actuator). Further, in an example operation, the actuator may actuate to cause one or more of the item grasping tools 902, 904, 906 . . . 90*n* to extend forward or retract backward from its current position. For example, in some embodiments, a first set of item grasping tools (e.g. item grasping tools 902 and 904), from amongst the item grasping tools 902, 904, 906 . . . 90*n* may be selectively actuated so to extend and/or move outwards from the second end 903 of the end effector 900. Thus, while the first set of item grasping tools (902 and 904) can be extended further from, a second set of the item grasping tools i.e. remaining item grasping tools (906 . . . 90*n*) may be unmoved and remain at its original position. In this regard, the first set of item grasping tools (902, 904) may be extended to so as to engage a portion of the first set of item grasping tools (902 and 904) with a surface of the item. In this regard, in some examples, flexible suction cups of the first set of item grasping tools (902 and 904) may engage with a surface of the item based on a vacuum suction force generated through the first set of the item grasping tools (902, 904). Further, upon engaging the item, the first set of the item grasping tools (902, 904) may be actuated to retract back to its original position, i.e. towards the second end 903, thereby positioning the first set of item grasping tools (902, 904) in-line (i.e. along a same plane) with the second set of the item grasping tools (906 . . . 90*n*). In this regard, in accordance with some example embodiments described herein, upon retracting, at least one item grasping tool (for example, item grasping tools 906) from amongst the second set of the item grasping tools (906 . . . 90*n*) may be configured to be actuated to further engage with the surface of the item already engaged to the first set of item grasping tools (902, 904), thereby providing additional engagement support to the item as the end effector 900 may maneuver the item upon picking. In other words, upon retracting the first set of item grasping tools (902 and 904) along with the item engaged with it, the item can further be engaged (e.g. gripped) by one or more of the remaining item grasping tools (906 . . . 90*n*).

In some examples, to grasp an item from a dispersion (e.g. stack or heap) of items by using an end effector, it can be advantageous, to minimize a surface area of the end effector that makes a contact with the item. In other words, reducing a footprint or the surface area enables improved gripping of the item by the end effector. Further, by way of implementation of various example embodiments described herein, extending a portion of the end effector (for instance, the flexible suction cup 210 as described in FIGS. 2-4 and/or the first set of item grasping tools 902 and 904 as described in reference to FIG. 9), causes a reduction in the footprint of the end effector that makes a contact with the item, thereby, enabling a unique interfacing of the end effector (202, 800, 900) with an item that is to be handled from amongst multiple items. In other words, by extending a limited number i.e. a set of item grasping tools from amongst all of the item grasping tools 902 . . . 902-*n*, the footprint of the end effector that engages the item is reduced thereby enabling precision grasping of a specific target item from amongst many items that may be stacked one over other. Furthermore, any unintentional contact of the end effector with neighboring items (i.e. items that are not to be picked) can be avoided and the item selected to be picked can be precisely picked from amongst the multiple items. Furthermore, in situations, where the end effector is to pick items from a stack of items of variable sizes, the end effector can effectively handle items including ones having high mass or low mass.

In accordance with various example embodiments, various characteristics (e.g. body shape, mass, body structure etc.) associated with the items can be identified and the end effector 900 of the item manipulation system 102 can be operated accordingly. To this end, in some examples, the control system (not shown) of the item manipulation system 102 may access, from the vision system 115, a plurality of images of a material handling environment including a plurality of items. In this aspect, based on processing the plurality of images, the control system may identify, a first item from amongst the plurality of items which is to be handled by the end effector. The first item herein may correspond to an item having a rigid body shape (e.g. a box, tote, carton, container, and/or the like). Upon identification of the first item, the control system may cause to actuate the first set of the item grasping tools (902, 904) to extend, outwards from the second end 904 and further from a second set of the item grasping tools (906 . . . 90n) to pick the first item based on an engagement of a surface of the first item with the first set of the item grasping tools (902, 904).

Further, in some example embodiments, the control system upon picking the first item may cause to actuate the first set of item grasping tools (902, 904) to retract back towards the second end 904 to position the first set of item grasping tools (902, 904) back in line with the second set of the item grasping tools (906 . . . 90n). Furthermore, in said example embodiments, the control system may cause to actuate the at least one item grasping tool (e.g. 906) from amongst the second set of the item grasping tools (906 . . . 90n) to engage with the surface of the item.

In accordance with various example embodiments described herein, the end effectors (106, 202, 800, 900) may include different configurations of item gripping mechanism suitable for engaging items of different body shapes. Some example gripping mechanisms of end effectors are, but not limited to, vacuum based gripper, claw based item manipulator, finger-based item manipulator, plate-based item manipulator, and/or the like, which are configured for picking, engaging, and/or handling the item 110, as desired.

According to some example embodiments, the repositioning system 105 including the end effector (106, 202, 800, 900) may further include one or more sensors, such as, but not limited to, cameras, a force sensor, a torque sensor, a distance sensor, to measure characteristics of the item 110 such as, but not limited to, body shape, body type, weight, position, orientation, center of gravity, size etc. The sensor data measured by such sensors may be utilized by the control system to control operations of the end effector (106, 202, 800, 900). For example, the sensor data may be utilized to actuate one or more item grasping tools (902-1, 902-2, 902-3 . . . 902-n) to extend or retract the respective tools for picking the item.

According to some example embodiments, the control system and/or any other subsystem of the item manipulation system 102 may determine, via the vision system 115, that the item 110 is to be manipulated from the first orientation to a second orientation. For example, the control system may determine a need of picking the item 110 from one location and placing the item 110 onto a downstream conveyor and/or section of the material handling system 100 to another location. For example, in some example embodiments, in some cases, a label and/or a marker placed on the item 110 may be upside down, or the item 110 may have a longer edge which may get jammed in the downstream conveyor, or the item 110 may need to be oriented in a specific orientation to fit a predetermined palletizing pattern, etc. Thus, on determining that the item 110 needs to be reoriented, the end effectors (106, 202, 800, 900) may be controlled to actuate and move to change the position and/or the orientation of the item 110.

According to various example embodiments described herein, the item manipulation system 102 and/or the end effectors (106, 202, 800, 900) may include, at least one ejector (not shown) adapted to eject the item gripped by the end effectors (106, 202, 800, 900). In this aspect, in some example embodiments, the at least one ejector may blow out compressed air through same channels or piping which is used for generating vacuum suction force through the flexible suction cup 210 and/or the tube 204.

According to some example embodiments described herein, the end effector (106, 202, 800, 900) may also include at least one laser range finder (not shown). In some example embodiments, the at least one laser range finder may be disposed on an end of the end effector (106, 202, 800, 900). In this regard, in accordance with said example embodiments, the at least one laser range finder may be configured to identify, for instance, periodically or continuously over a period of time, the item 110 to be positioned in the first orientation and a requirement for picking the item 110. The laser range finder may also be configured to determine a distance at which the item 110 is positioned with relative to the end effector (106, 202, 800, 900). For example, in some embodiments, the laser range finder may determine the distance based on which the control system may cause the robotic arm to position the end effector (106, 202, 800, 900) into different operating positions. Thus, in some example embodiments, based on the determined distance communicated to the control system, the end effector (106, 202, 800, 900) may be moved into at least one of: (a) the picking position to pick the item 110 in the first orientation, (b) the gripping position in which the item is gripped by the end effector (106, 202, 800, 900), (c) the retrieval position in which one or more item grasping tools (e.g. the flexible suction cup 210 or item grasping tools (902-1, 902-2, 902-3, . . . 902 . . . n) may be selectively actuated to extend and pick the item 110 from amongst a pile of items, and (d) the discharging position, in which the end effector (106, 202, 800, 900) may be moved to place the item 110 by one or more ejectors of the item manipulation system 102.

Having described aforesaid steps, by way of an example implementation of said embodiments, a speed at which the items are manipulated by the item manipulation system 102 based on afore-described steps, is much faster than a stationary scanning, item handling, and/or manipulation approach, resulting in improved system throughput, item handling rate, and item handling efficiency.

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. An item manipulation system comprising:
   a control system;
   an end effector communicatively coupled to the control system, the end effector comprising:
      a tube defining a channel between a first end and a second end, the tube comprising:
         a flexible suction cup movably positioned within the channel of the tube, the flexible suction cup configured to engage a surface of an item based on vacuum suction force generated through the flexible suction cup; and
         a linear actuator mechanically coupled to the flexible suction cup, the linear actuator configured to:
            extend, the flexible suction cup towards the second end of the channel to position at least a portion of the flexible suction cup outside of the tube; and
            retract, the flexible suction cup within the channel to position the flexible suction cup within the tube, wherein the control system is configured to:
               identify characteristics of the item, wherein the characteristics of the item includes at least a body shape of the item; and
               actuate the linear actuator based on the identified characteristics of the item to one of:
                  position the flexible suction cup within the tube of the end effector when the identified characteristics of the item corresponds to a flexible body shape of the item, and
                  position at least a proximal end of the flexible suction cup outside the tube of the end effector when the identified characteristics of the item corresponds to a rigid body shape of the item.

2. The item manipulation system of claim 1, wherein the control system is configured to:
   upon positioning the at least portion of the flexible suction cup outside the tube, actuate the flexible suction cup to grip a first item of a first body shape based on an engagement of a proximal end of the flexible suction cup with a surface of the first item.

3. The item manipulation system of claim 2, wherein the control system is further configured to:
   upon positioning, the flexible suction cup within the tube, actuate the flexible suction cup to grip a second item of a second body shape based on an engagement of a surface of the second item with the second end of the tube.

4. The item manipulation system of claim 1, wherein the linear actuator is a pneumatic cylinder comprising a piston and wherein a distal end of the flexible suction cup is engaged to an end of the piston via an end shaft.

5. The item manipulation system of claim 1, wherein the control system is configured to at least:
   cause to generate, via a vacuum generator, vacuum suction force through at least one of the tube and the flexible suction cup.

6. An end effector comprising:
   a tube defining a channel between a first end and a second end, the tube comprising:
      a flexible suction cup movably positioned within the channel defined by the tube, the flexible suction cup configured to engage a surface of an item based on vacuum suction force generated through at least one of: the flexible suction cup and the channel defined by the tube; and
      a linear actuator mechanically coupled to the flexible suction cup, the linear actuator configured to:
         extend, the flexible suction cup towards the second end of the channel to position at least, a portion of the flexible suction cup, outside of the tube; and
         retract, the flexible suction cup within the channel to position the flexible suction cup within the tube, wherein the end effector is configured to:
            identify characteristics of the item, wherein the characteristics of the item includes at least a body shape of the item; and
            actuate the linear actuator based on the identified characteristics of the item to one of:
               position the flexible suction cup within the tube of the end effector when the identified characteristics of the item corresponds to a flexible body shape of the item, and
               position at least a proximal end of the flexible suction cup outside the tube of the end effector when the identified characteristics of the item corresponds to a rigid body shape of the item.

7. The end effector of claim 6, wherein the end effector is configured to:
   pick a first item of a first body shape by engaging a surface of the item with the flexible suction cup based on vacuum suction force drawn through the flexible suction cup; or
   pick a second item of a second body shape by engaging the surface of the item with the second end of the tube based on vacuum suction force drawn through at least one of: the flexible suction cup and the channel defined by the tube.

8. The end effector of claim 6, comprising:
   an ejector adapted to release an item that is engaged by the end effector by employing compressed air ejected through the ejector.

9. The end effector of claim 6, wherein the linear actuator is a pneumatic cylinder comprising, a piston and wherein a distal end of the flexible suction cup is engaged to an end of the piston via an end shaft.

10. The end effector of claim 6, comprising a vacuum generation system configured to:
    generate vacuum suction force through a vacuum generator; and
    draw, via a channel, the vacuum suction force through at least one of: the tube and the flexible suction cup.

11. An item manipulation system comprising:
    a control system;
    an end effector communicatively coupled to the control system the end effector defining:
       a first end, configured to be engaged to a robotic tool;

a second end defining an array of item grasping tools configured to engage with a surface of an item, wherein a first set of item grasping tools, from amongst the array of item grasping tools, is configured to be selectively actuated by the control system to:
    extend, outwards from the second end and further from, a second set of the item grasping tools, remaining from amongst the array of item grasping tools, to engage with a surface of the item based on a vacuum suction force generated through the first set of the item grasping tools; and
    retract, towards the second end to position the first set of item grasping tools in-line with the second set of the item grasping tools, wherein upon retracting, at least one item grasping tool from amongst the second set of the item grasping tools is configured to further engage with the surface of the item engaged to the first set of item grasping tools, wherein the control system is configured to:
    identify characteristics of the item, wherein the characteristics of the item includes at least a body shape of the item; and
    actuate a linear actuator based on the identified characteristics of the item to one of:
        position a flexible suction cup within a tube of the end effector when the identified characteristics of the item corresponds to a flexible body shape of the item, and
        position at least a proximal end of the flexible suction cup outside the tube of the end effector when the identified characteristics of the item corresponds to a rigid body shape of the item.

12. The item manipulation system of claim 11, wherein the array of item grasping tools comprises at least one of: a clamp, a static gripper, an electromagnetic gripper, an electrostatic gripper, and a vacuum suction cup.

13. The item manipulation system of claim 11, wherein the control system is configured to:
    access, from a vision system, a plurality of images of a material handling environment including a plurality of items;
    based on processing the plurality of images, identify, a first item from amongst the plurality of items which is to be handled by the end effector; and
    cause to actuate the first set of the item grasping tools to extend, outwards from the second end and further from a second set of the item grasping tools, to pick the first item based on an engagement of a surface of the first item with the first set of the item grasping tools.

14. The item manipulation system of claim 11, wherein the control system is configured to:
    upon picking the first item, cause to actuate the first set of item grasping tools to retract towards the second end to position the first set of item grasping tools back in line with the second set of the item grasping tools; and
    cause to actuate the at least one item grasping tool from amongst the second set of the item grasping tools to engage with the surface of the item.

15. The item manipulation system of claim 11, comprising:
    a vacuum generator adapted to generate vacuum suction force through one or more of the array of the item grasping tools; and
    an ejector adapted to release the item that is engaged by the end effector based on employing compressed air ejected through the ejector.

\* \* \* \* \*